United States Patent [19]

Green

[11] Patent Number: 5,673,573
[45] Date of Patent: Oct. 7, 1997

[54] ANTI-TAMPER DEVICE FOR AUDIO AND COMPUTER DEVICES HAVING CASSETTE OR DISKETTE RECEIVING SLOT

[76] Inventor: Terence R. Green, 13 Jeeves Close, Peartree Bridge, Milton Keynes, England, MK6 3PB

[21] Appl. No.: 564,497

[22] Filed: Nov. 29, 1995

[30] Foreign Application Priority Data

Nov. 30, 1994 [GB] United Kingdom ............ 9424148

[51] Int. Cl.$^6$ .................................................. E05B 73/00
[52] U.S. Cl. ........................ 70/14; 70/58; 70/169; 292/91; 292/DIG. 38
[58] Field of Search ..................... 70/14, 58, 169, 70/57, 163–168, 170–173, 158; 292/91, 19, DIG. 38

[56] References Cited

U.S. PATENT DOCUMENTS

| | | | |
|---|---|---|---|
| 917,721 | 4/1909 | Durkee | 70/169 |
| 1,216,697 | 2/1917 | Kamianczyn et al. | 292/39 |
| 1,691,975 | 11/1928 | Irwin | 292/91 X |
| 1,774,091 | 8/1930 | Glawe et al. | 70/169 |
| 1,853,427 | 4/1932 | Hollister | 70/165 |
| 2,215,395 | 9/1940 | Hedman | 292/91 X |
| 3,625,031 | 12/1971 | Alley, III . | |
| 3,893,581 | 7/1975 | Kapphahn | 70/169 X |
| 4,616,490 | 10/1986 | Robbins | 70/14 |
| 4,640,106 | 2/1987 | Derman | 70/14 |
| 4,908,728 | 3/1990 | Pinkett | 70/163 X |
| 4,922,734 | 5/1990 | Iannucci | 70/58 |
| 4,924,683 | 5/1990 | Derman | 70/14 |
| 4,959,979 | 10/1990 | Filipow et al. | 70/163 X |
| 4,964,286 | 10/1990 | Poyer | 70/58 |
| 5,094,483 | 3/1992 | James | 292/39 |
| 5,117,661 | 6/1992 | Carl et al. | 70/14 |
| 5,156,027 | 10/1992 | Reusch | 70/58 X |

FOREIGN PATENT DOCUMENTS

| | | | |
|---|---|---|---|
| 118200 | 9/1984 | European Pat. Off. . | |
| 165702 | 12/1985 | European Pat. Off. . | |
| 1933732 | 1/1971 | Germany | 292/91 |
| 3733658 | 4/1989 | Germany . | |
| 8913783.3 | 2/1990 | Germany . | |
| 1570616 | 7/1980 | United Kingdom . | |
| 2168522 | 10/1988 | United Kingdom . | |
| 2240423 | 7/1991 | United Kingdom . | |
| WO89/05510 | 6/1989 | WIPO . | |
| 89/09993 | 10/1989 | WIPO . | |

*Primary Examiner*—Lloyd A. Gall
*Attorney, Agent, or Firm*—Cushman, Darby & Cushman IP Group of Pillsbury Madison & Sutro LLP

[57] ABSTRACT

An anti-tamper device for use with apparatus of the type having a slot for receiving a component needed in use. In one embodiment, a first portion is insertable into the tape receiving slot of a cassette player mounted in a vehicle. When inserted, the portion lies in front of the tape player. The first portion has sprung projections which protrude outwardly therefrom and prevent the device as a whole from being withdrawn from the cassette player when inserted therein. To insert the device the first portion is simply pushed home into the cassette receiving slot. In order to remove the device from the cassette player, the projections must first be compressed by sliding them beneath the first portion. The projections are connected to a slider which is moved to and fro by turning a key in a lock barrel. The device is secured to the steering wheel of a vehicle by a cable having a loop at one end.

16 Claims, 4 Drawing Sheets

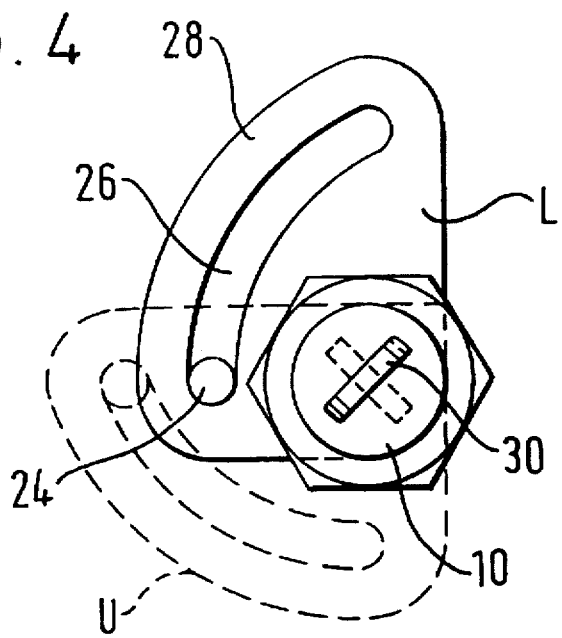
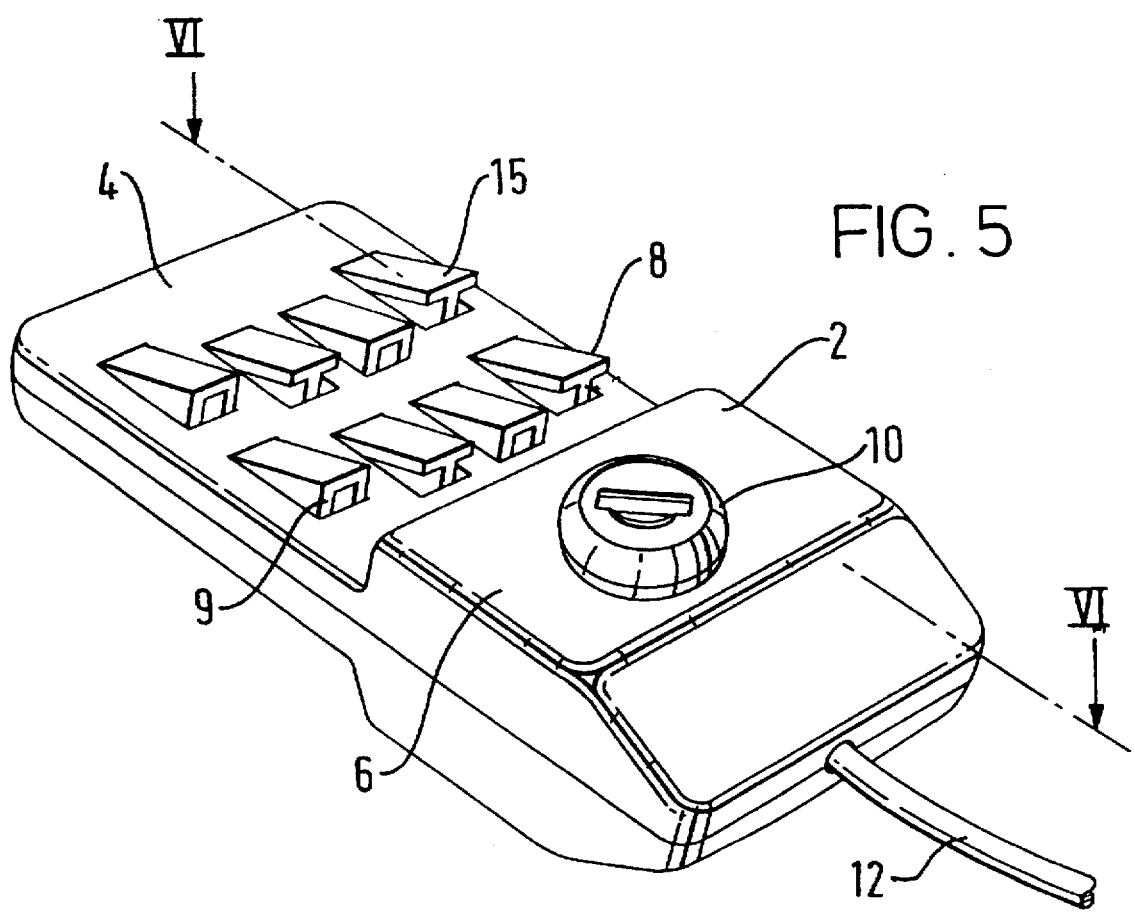

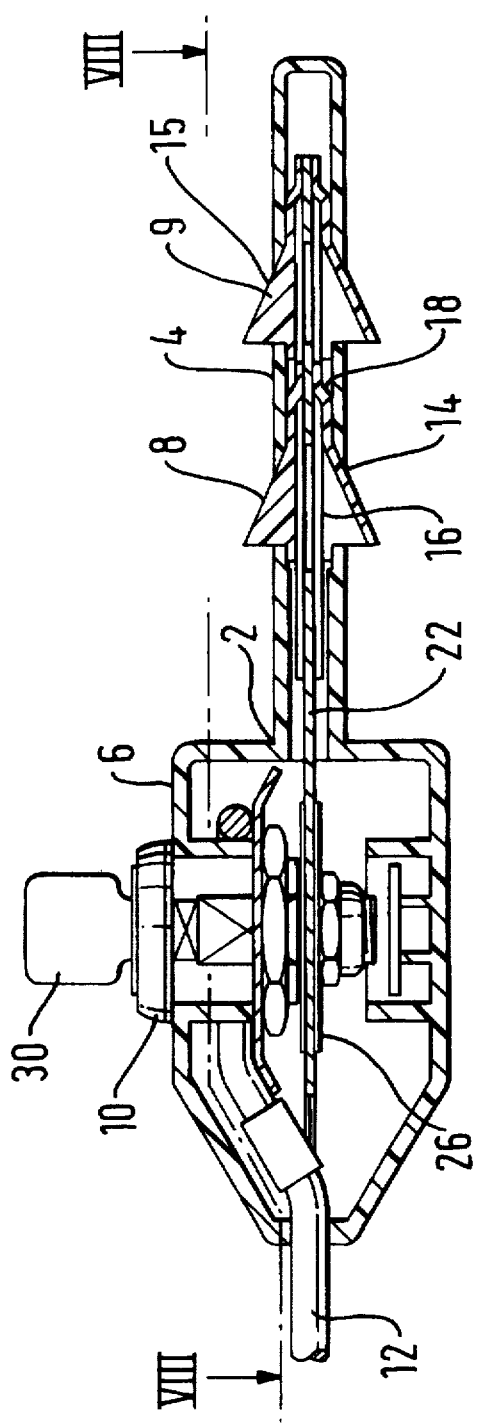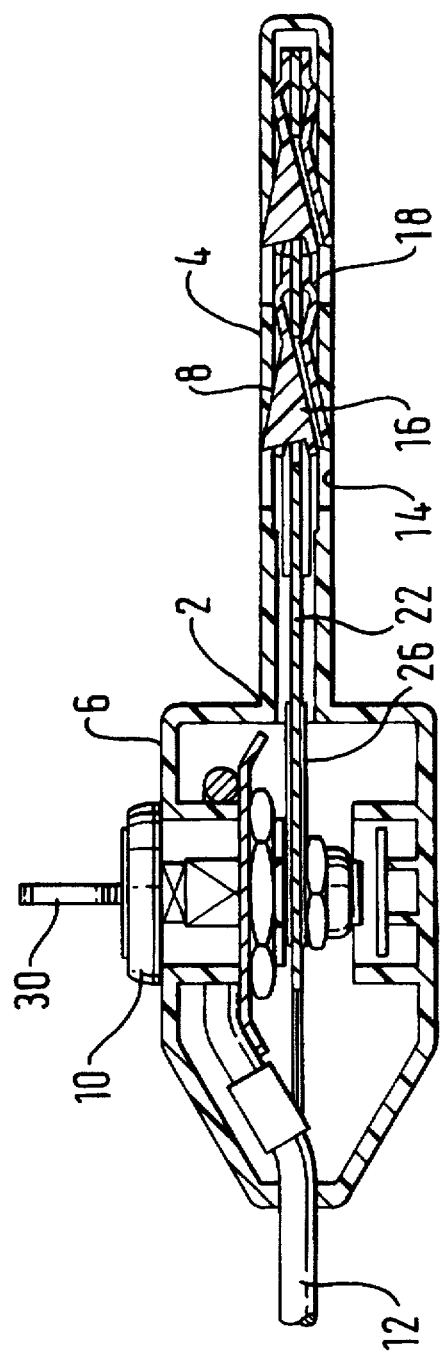

ANTI-TAMPER DEVICE FOR AUDIO AND COMPUTER DEVICES HAVING CASSETTE OR DISKETTE RECEIVING SLOT

FIELD OF THE INVENTION

The present invention relates generally to an anti-tamper device for use with apparatus of the type having a slot for receiving a component needed in use. In particular, the present invention relates to a device for preventing the use of and discouraging the theft of tape cassette players, especially cassette players mounted in a vehicle. The anti-tamper device of the invention can also be used to prevent unauthorised use and deter theft of equipment such as video cassette players and computers.

BACKGROUND TO THE INVENTION

Various devices are known which can be inserted into the cassette receiving space of a cassette tape player and then locked in position. In order to insert a tape into the cassette player it is first necessary to unlock the anti-tamper device and remove it. If an attempt is made to remove the anti-tamper device forcibly then damage results to the cassette player which renders it useless.

U.S. Pat. No. 4,616,490 (Robbins) discloses a tape cassette player locking device comprising two integral portions, one for inserting into the tape player, the other carrying a lock barrel for use by the user of the device. The lock barrel extends in the form of a rod into the first portion. The first portion has locking means therein which in a resting position are contained within the first portion. Each locking means is provided with a spring acting between part of the locking means and the first portion. The locking means can be caused to protrude from the first portion by rotating the lock barrel and therefore the rod. In rotating, the rod bears directly against the locking means forcing them outwards. In forcing the locking means outwards the springs are compressed. Rotation of the lock barrel back to an unlocked position means that the locking means are urged back into the first portion by the springs.

The end of the actuating rod which bears against the locking means to move them is pivotally mounted to the rest of the rod. If one of the locking means is prevented from protruding from the first portion by part of the cassette player then the rod end pivots and forces the opposed locking means to protrude from the first portion to a greater degree than if there was no obstruction against either locking means. The Robbins device would seem unable to function in a cassette player whose internal construction is such that it prevents opposed locking means from protruding. If an obstruction prevents opposed locking means from protruding the user may damage the interior of the cassette player by forcing the actuating means to try and overcome the obstruction. If, as is likely, the device can only be locked when inserted to a specific extent into the cassette slot, there is no way for this position to be adjusted or for a user to tell where it will be.

GB 2168522 (Red Bronze) discloses an audio cassette with a locking mechanism. The locking mechanism comprises a lock barrel with a rod extending therefrom. The end of the rod carries a thread. There is a cog pivotally mounted to the interior of the cassette. There is also a rack bolt. The cog is engaged with both the thread and the rack bolt. Starting from an unlocked position, the rotation of the key rotates the rod and thread thereby rotating the cog and sliding the rack bolt out from the cassette. Unlocking involves a reverse operation. Instead of bolts which are moved in and out of the dummy cassette, a pair of clamps may be provided which can move in to and out of engagement with the capstan wheels of the cassette player.

GB 1570616 (Telcefo) discloses similar locking devices to GB 2168522.

The inventor has also found that the above prior art devices are not of universal application. There are some types of cassette player in which the devices do not lock effectively.

A problem with all of the above devices is that they comprise a plurality of moving parts. Each of these parts needs to be made accurately. If not then the devices will not operate smoothly and be prone to jamming. In addition to the high cost of producing the parts, additional labor and time is involved in the assembly of the devices.

U.S. Pat. No. 4,640,106 (Derman) discloses an anti-theft device for a cassette player. The device has a portion for inserting into the tape player and a portion which carries a lock barrel. A rod extends from the lock barrel and is rotated by the turning of a key in a lock. The rod carries a spigot. In moving from an unlocked to a locked position, the spigot is translated by 90°. The spigot is mounted to the rod by a connection so that the position of the spigot along the rod can be adjusted in order to provide the securest locking of the device in a given cassette player.

The Derman device involves few parts but there is only a single locking spigot adjustable to a limited extent. The device is therefore not wholly applicable to all types of cassette player. Also, the rotational movement of the spigot about the longitudinal axis of the rod means that it is possible for the user to turn the key in the lock with too much force and thereby unwittingly damage the mechanism of the cassette player. Such damage could easily occur while the user of the device is adjusting it to fit a given cassette player.

WO 89/09993 (Blair) discloses a dummy cassette for insertion into a cassette player in a "play" position. A cover is provided which then locks to the dummy cassette held in the cassette player in the "play" position. The cover prevents access to the eject button of the cassette player and so the combined cover and dummy cassette are effectively locked in place and can only be separated by using the key.

BRIEF DESCRIPTION OF THE INVENTION

The present invention provides an anti-tamper device for use with apparatus of the type having a slot for receiving a component needed in use, which device comprises a first portion for insertion into said slot in an insertion direction to block the same and a second portion, at least one retractable locking projection on said first portion moveable between a retracted first position and a second position in which it is resiliently biassed to protrude outwardly of said first portion transverse to said insertion direction, resilient biassing means acting on said locking projection(s) to urge said locking projection(s) outwardly into said second position, and actuating means operable from said second portion and serving to move said locking projection(s) between said second and first positions and to enable movement of said locking projection(s) from said first position to said second position in response to said resilient biassing means.

Preferably, the resilient biassing means urges the locking projection(s) into said second position with only a small force. The force is small enough so that when the device is in use damage should not occur to any part of the apparatus which the locking projection(s) come into contact with.

An anti-tamper device in accordance with the invention as illustrated hereafter can be used to protect a variety of models of an apparatus type without prior modification or adjustment by the user. The possibility of damaging the apparatus during an adjustment procedure such as that required with the Derman device is therefore avoided.

The apparatus may include video cassette players, microcomputers, computer disc drives, electronic apparatus with card interfaces and automatic teller machines. The apparatus in question may have more than one slot in which case more than one device can be used. Alternatively, the device of the present invention can be modified so that there is more than one first portion and these first portions are linked together by said second portion.

Where audio cassette players are concerned, the illustrated device can be used effectively largely regardless of the particular internal arrangement of cassette drive and playback components. A single device can be used to protect cassette players regardless of the orientation of cassette tapes which the cassette player is designed to receive. Players receiving tapes sideways or head on can be protected with a single device.

Preferably, the operation of the actuating means to move said locking projection(s) from said second to said first position forces said locking projection(s) against said first portion.

The locking projection(s) is/are preferably linked to the actuating means so that the movements of the actuating means are also undertaken by the locking projection(s). However, the locking projection(s) is/are still free to undergo movement from said second to said first positions independently of the actuating means if an external force is applied to the locking projection(s). Such an external force may arise when the first portion is pushed into an apparatus slot and the projections run against and over obstructions in the slot.

The first portion preferably has at least one aperture therein and the locking projection(s) when in other than said first position protrude(s) outwardly through the or a respective aperture.

The locking projection(s) and respective resilient biassing means are preferably integral with one another. This has the advantage of reducing the number of parts that the device is made from thereby simplifying assembly and reducing production costs. On the other hand, the resilient biassing means may be provided as a separate component from the locking projection(s). A separate resilient component may be a spring, e.g. a coil spring or leaf spring although an appropriately shaped body of resilient material e.g. rubber may suffice.

One or more locking projection(s) are preferably provided on opposed surfaces of the first portion, in particular the upper and lower surfaces of the first portion. However, locking projection(s) can be provided anywhere on the first portion such as on one side surface only or along one or more edges of the first portion.

Preferably, a plurality of locking projection(s) is 10 provided on each side of the first portion. This enables the device to protect a range of different models of apparatus effectively. The number of locking projection(s) is preferably in the range 3 to 20, more preferably 5 to 10. Depending on the relative sizes of the locking projection(s) and the first portion, substantially all of the upper and lower surfaces of the first portion may be provided with locking projection(s).

The locking projections are preferably moveable independently of one another in response to an external force applied directly to the projections. However, this independent movement may also arise in response to independently operating actuating means.

Preferably, there are opposed locking projections with cutaway portions which enable opposed projections to interdigitate with one another when in other than said second position. The width of the first portion with the locking projections in said retracted first position will need to be less than the width of the apparatus slot in order for the device to be removed from the apparatus. Therefore, opposed projections with cutaway portions enable a maximum protrusion of projections in said second position while enabling a minimum protrusion in said first position.

The locking projection(s) preferably include(s) an inclined bearing surface facing the direction of insertion. The inclined bearing surface of each locking projection allows the insertion of the first portion into the slot when the locking projection(s) is/are protruding outwardly in said second position. When the inclined bearing surface of a projection comes into contact with a part of the apparatus then the continued insertion of the first portion into the slot causes the projection to slide against the apparatus. As the projection slides against the apparatus it is forced towards its retracted first position. The resilient biassing means is thereby biassed to urge the locking portion back into said second position once the locking projection is relieved of the obstructing part of the apparatus. Furthermore, the surface of the locking projection facing away from the direction of insertion is preferably unable to travel along an obstructing part of the apparatus. The surface facing away from the direction of insertion is substantially transverse to the direction of insertion. The device can therefore be inserted into an apparatus slot to lock it in position without having to use the actuating means. During insertion, the locking projections are simply depressed by any obstructions in the slot and then spring back to their outwardly protruding second positions if free to do so when the device is fully inserted. Removal of the device from the slot requires the operation of the actuating means.

The locking projection(s) is/are preferably generally U-or V-shaped in transverse section so that integral resilient biassing means may be provided by the bight portion of the locking means. The locking elements are then provided by the end portions of the arms of the U or V. The arms of the U or V may cross over so that the resilient bight portion becomes a loop.

The resilient biassing means is/are preferably placed under compression when the locking portion(s) is/are in other than said second position.

Preferably, at least a part of the actuating means is slidable inside said first portion. The first portion may comprise a housing having at least one aperture therein and the actuating means may be enclosed within the housing.

The actuating means may comprise at least one plate with apertures therein in which case said locking projection(s) are not linked to the plate(s). Alternatively, the actuating means may comprise one or more plates, strips or rods which the locking projection(s) are linked to that they undergo simultaneous movement with said plates, strips or rods.

The actuating means itself may have said aperture or apertures therein and form at least part of the exterior of the first portion. The locking projection(s) acted on by the actuating means and not linked thereto may be carried by the interior of the first portion and the actuating means will be slidable over said locking projection(s). In undertaking sliding movements, the aperture or apertures will be brought into or out of alignment with the locking projection(s). When the aperture(s) are in alignment with the locking projection(s) then the locking projection(s) will be in said second position. When the aperture(s) are out of alignment then the actuating means will force the locking projection(s) into said first position.

Where a plurality of apertures is employed, whether in the housing, the actuating means or both, the arrangement may be such that one or more locking projection(s) are allowed to protrude outwards transversely more than others. In this way the device can be configured to fit the largest number of models of apparatus as possible. Alternatively, if desired the device may be configured to fit particular models of apparatus better than others.

A single device may comprise more than one of the aforementioned actuating means and locking projection(s) combinations referred to above.

The actuating means preferably includes rotatable means provided in said second portion for operation by the user of the device, the rotation of the rotating means causing a corresponding sliding movement of the rest of said actuating means. The rotatable means may include a cam which bears against a surface of the rest of the actuating means. Alternatively, the rotatable means may include guide means which guides the movement of a guide member therein, the guide member being attached to the rest of the actuating means. A preferred rotatable means is a key operated lock barrel.

The device may further comprise connecting means for connecting the device to another object. In the case of vehicle tape players the object may be a fixture of the vehicle which cannot easily be removed, e.g. the steering wheel. Preferably, the connecting means will be substantially resistant to severance by tools such as hacksaws, snips and files. A preferred connecting means is a cable, most preferably the cable comprises wires wound around a core of a resilient material, e.g. rubber. A chain or rod may suffice as the connecting means.

In order to alert would be car thieves to the connecting means and thereby deter them from attempting to remove the cassette player and anti-tamper device, the connecting means may be brightly colored, luminous or fluorescent.

Preferably, one end of the connecting means is coupled permanently to said first portion and/or said second portion although the connecting means may be lockable to said second portion. A preferred connecting means comprises a cable with a loop at the free end thereof, the loop being sufficiently large that the first and second portions of the device can be passed through the loop.

The locking means are preferably made from a resilient material e.g. metal, particularly spring steel or a plastics material. A plastics material is most preferred because it allows locking means with integral resilient means to be manufactured quickly and relatively cheaply by a molding process. Combinations of metal and plastics can be used in the locking means.

BRIEF DESCRIPTION OF THE DRAWINGS

Preferred embodiments of the invention will now be described with reference to FIGS. 1 to 3 in which:

FIG. 4 is a plan view of part of the actuating means.

FIG. 5 is a perspective view of a second embodiment of the invention in "locking" mode.

FIG. 6 is longitudinal section through the device of FIG. 6 along line VI—VI.

FIG. 7 is a similar longitudinal section to that shown in FIG. 6 except that the device is in "unlocked" mode.

DETAILED DESCRIPTION OF PREFERRED EMBODIMENTS

Figure 1:
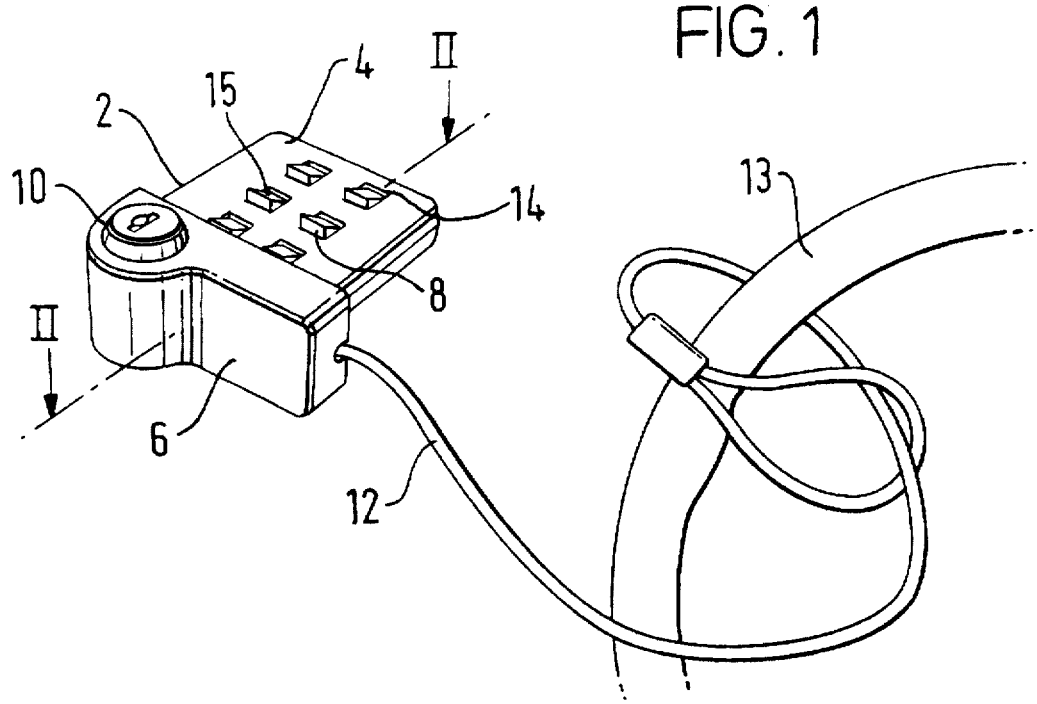
FIG. 1 is a perspective view of a preferred device in a "locking" mode.

FIG. 1 shows an anti-tamper device for insertion into the cassette receiving slot of an audio tape player mounted in a motor vehicle. The device 2 comprises a first portion 4 and a second portion 6 integral with one another. The first portion has a series of six projections 8. The projections 8 are arranged in two rows of three. The projections are provided on both the upper and lower surfaces of the first portion 4. Each projection 8 has an inclined bearing surface 15 facing the direction of insertion of the device into the tape player slot. In the device 2 shown in FIG. 1, the projections 8 are raised and so if the device 2 was in position in the cassette receiving slot of a tape player then it would be locked in position. The projections 8 would extend into gaps in the cassette receiving slot and drive mechanism of the cassette player, thereby preventing the removal of the device 2 from the cassette player unless the projections 8 are retracted back into the first portion 4. The second portion 6 has a lock barrel 10 which forms part of the actuating means (described in more detail below). The lock barrel 10 is operated by way of key (not shown) and the actuating means raises or lowers the projections 8 into and out of the locking position shown in FIG. 1. A cable 12 with an end loop is permanently connected to the device 2 and this permits the device 2 to be coupled easily to a permanent fixture of the vehicle e.g. the steering wheel 13 in the manner illustrated in FIG. 1.

Figure 2:
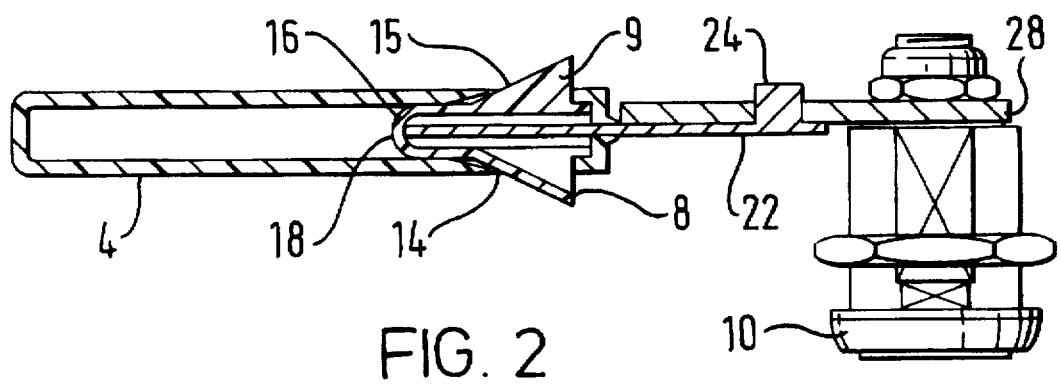
FIG. 2 is a longitudinal section through the device of FIG. 1 along lines II—II omitting detail of some locking means.
Figure 3:
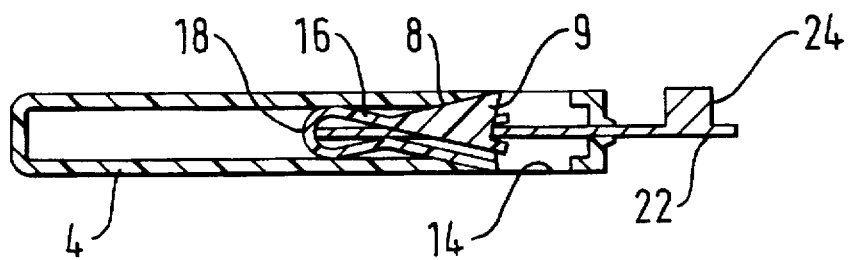
FIG. 3 is a similar longitudinal section as FIG. 2 excluding detail of some of the actuating mechanism and with the device in an "unlocked" mode and ready for removal from or insertion into an audio cassette player/cassette receiving slot.

The components of the device can be seen in more detail in FIGS. 2 and 3 in which only one projection 8 is shown for the sake of clarity. In FIG. 3 part of the actuating means is omitted for the sake of clarity. The upper and lower surfaces of the first portion 4 have apertures 14 to permit the projections 8 to protrude outside the first portion. Each projection 8 is a part of a compressible body 16. The body 16 includes a resilient bight portion 18.

FIG. 2 shows the device in "locking" mode. The body 16 is in a non-compressed state. Each projection 8 protrudes through a respective aperture 14 and the resilient portion 18 is not subject to compression. In order that opposed projections 8 do not clash when compressed together their transverse strengthening walls 9 are arranged so that they may interdigitate with one another. One projection is generally U-shaped in cross-section while the other is generally T-shaped. This allows the greatest, possible, protrusion of the projections from the first portion while ensuring that the projections lie flush or within the first portion when fully retracted. The width of the first portion with its projections in a retracted position is governed by the width of the intended apparatus slot. The first portion width will of course need to be less than the slot width in order to allow withdrawal from the slot. The aforementioned interdigitation permits the best possible latching by opposed locking projections.

FIG. 3 shows the device in "unlocked" mode. The body 16 is in a compressed state. The walls of the first portion 4 in the region of the apertures 14 squeeze the projections 8 together and thereby compress the resilient portion 18. The projections 8 do not protrude through the apertures 14. In moving from the non-compressed state to the compressed state the inclined bearing surfaces 15 of projections 8 allow the body 16 to slide against the first portion. The parts of the first portion in the region of aperture 14 which slide against bearing surfaces 15 are chamfered to assist the sliding of the projections 8.

The body 16 is attached to a slider 22 which is free to slide inside the first 4 and second 6 portions. The slider 22 has a spigot 24 in the region of the first portion 4. The spigot 24 is located in a curved slot 26 provided in a plate 28. The plate 28 is bolted to the end of lock barrel 10.

Starting from the "locking" position shown in FIG. 2 and the position L shown in FIG. 4, the key 30 is rotated by 90° in the barrel 10. The plate 28 shown in FIG. 4 then moves to the position U shown in FIG. 4. In moving from L to U the plate 28 bears against the spigot 24 pushing it away from the lock barrel 10. This in turn forces the body 16 beneath the first portion 4 thereby compressing it. The final compressed position shown in FIG. 3 is achieved when the key is rotated a full 90°. The device 2 shown in FIG. 3 is now ready for insertion into the cassette receiving space of a tape player. Once inserted, the projections 8 are raised to lock the device 2 in place. Locking simply involves the turning of the key 30 back through 90° so plate 28 is in position L shown in FIG. 4. The body 16 adopts the position shown in FIG. 2.

The compressibility of the body 16 will mean that when the device 2 is in place in a cassette player, the projections 8 will only extend so far as they are permitted to do so by the internal structure of the cassette player. In some areas the projections 8 will extend fully outwards from the first portion as shown in FIGS. 1 and 2 whereas in other areas the projections 8 may be prevented from protruding through the apertures 14 to varying degrees, in some cases not at all.

The device 2 can however be inserted into the cassette player slot without first lowering projections 8. The first portion is simply inserted into the slot with the projections 8 in their "locking" position and pushed home. If projections 8 encounter any obstruction then the inclined bearing surfaces 15 simply run against these obstructions and in doing so the projection 8 is pushed towards its retracted position in the first portion 4. If obstructions are present on both sides of the first portion 4 then both projections 8 may be pressed into the first portion 4 resulting in the compression of the body 16. When pushed home fully into the cassette receiving slot some projections 8 may still be obstructed whereas others will no longer be obstructed and will have sprung into the fully "locking" positions shown in FIG. 2. The walls of the projections 8 facing in the direction opposite to that of insertion are substantially transverse to the direction of insertion. Accordingly when these transverse walls meet an obstruction in the cassette receiving slot the device cannot be removed from the apparatus unless the projections 8 are withdrawn to their "unlocked" positions shown in FIG. 3 using the actuating means.

For any given tape player, at least one of the projections 8 should seat firmly in a gap in the cassette player so that an attempt to remove the device without using the key may result in damage to the tape player.

If desired individual projections 8 may be locked down by inserting a blanking plug to close off the respective aperture 14 of the first portion 4. The blanking plug may be a rectangular plate having on each of two opposed sides a tooth or flange projecting laterally outwards and recessed below the level of the plate for latching under walls of the first portion 4 bordering the aperture 14. This may be desirable if it is found that a particular type of cassette player has some sensitive component that would otherwise be contacted by the projection 8 that is to be locked down.

A second embodiment is shown in FIGS. 5 to 8. The second embodiment is similar to the first and works in a similar way. Many of the components are the same. However, there are eight projections 8 on each side of the first portion 4 instead of just six. The projections 8 are arranged so that they do not form exact rows. The outer pairs of projections are displaced from the inner pairs. The provision of a larger number of projections in other than a strictly regular array is considered to assist in making the device better able to lock with a wider range of cassette players than a device having a regular array of fewer projections.

In the second embodiment the spigot 24 on the slider is replaced by a window 32 in the slider. The plate 28 and slot 26 are replaced by a cam 34. The cam is attached to the end of the lock barrel 10 so that it is rotated by turning the key 30.

Figure 8:
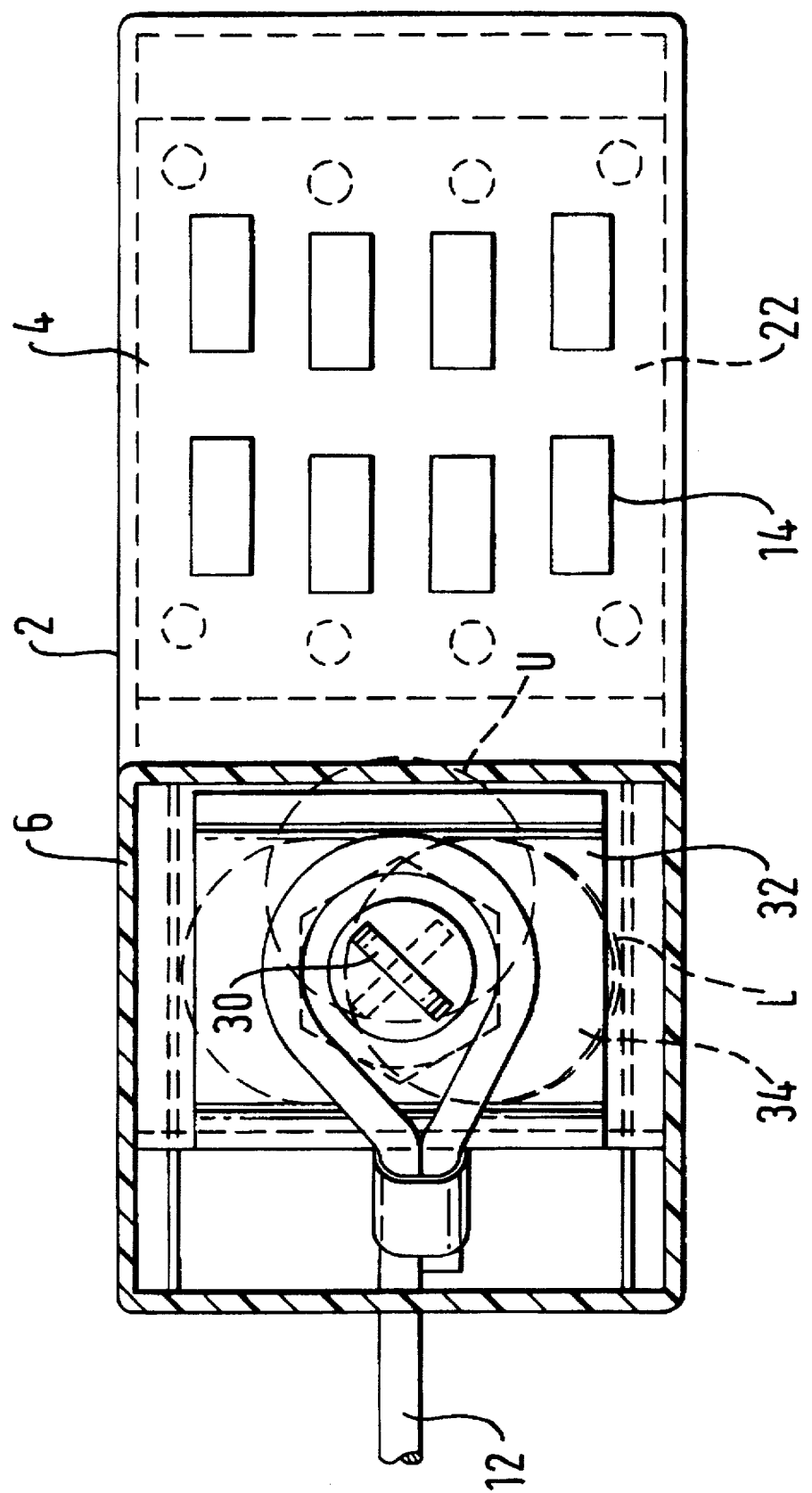
FIG. 8 is a partial plan and sectional view taken along line VIII—VIII of FIG. 6 but excluding some detail of the locking means.

FIG. 6 shows the device in a "locking" mode, as does FIG. 8. When the key 30 is rotated by 90° the cam 34 translates from position L in FIG. 8 to position U shown in broken lines.

The compressible bodies 16 are made from a resilient plastics material. The device 2 is conveniently provided as two parts which have respective lugs and projections which snap fit with one another. The parts can also be screwed or glued together. The two parts are conveniently molded from a tough plastics material.

Although the invention has been described with reference to the embodiments illustrated in the drawings, many modifications and variations thereof are possible within the scope of the invention.

I claim:

1. An anti-tamper device for use with cassette players and computers of the type having a slot for receiving a component needed in use, which device comprises a first portion sized and shaped for insertion into said slot of said cassette players and computers in an insertion direction to block the same and a second portion for remaining outside said slot, said first portion being a tongue having a pair of oppositely facing minor surfaces and a pair of oppositely facing major surfaces and a plurality of retractable locking projections on each said major surface of said first portion, each said projection being moveable between a retracted first position and a second position in which it is resiliently biassed to protrude outwardly of said first portion transverse to said insertion direction, resilient biassing means acting on each said locking projection to urge said locking projections outwardly into said second position, and actuating means operable from said second portion and serving to move said locking projections from said second position to said first position for unlocking and to enable movement of said locking projections from said first position to said second position in response to said resilient biassing means for locking said first portion in said slot.

2. A device as claimed in claim 1, wherein the operation of the actuating means to move said locking projections from said second to said first position forces said locking projections against said first portion.

3. A device as claimed in claim 1, wherein the first portion has apertures therein and the locking projections when in said second position protrude outwardly through said apertures.

4. A device as claimed in claim 1, wherein the locking projections and respective resilient biassing means are integral with one another.

5. A device as claimed in claim 1, wherein the projections form opposed pairs, one projection of each said pair having at least one recess which receives a portion of its opposed projection when the projections are in said first position.

6. A device as claimed in claim 1, wherein the locking projections include an inclined bearing surface facing the direction of insertion.

7. A device as claimed in claim 1, wherein the resilient biassing means is under compression, at least when the locking portions are in other than said second position.

8. A device as claimed in claim 1, wherein at least a part of the actuating means is slidable inside said first portion.

9. A device as claimed in claim 8, wherein the actuating means includes rotatable means provided in said second portion for operation by the user of the device, the rotation of the rotatable means causing a corresponding sliding movement of the said slidable part of said actuating means.

10. A device as claimed in claim 9, wherein the rotatable means includes a cam which bears against a cam follower surface of the said slidable part of the actuating means.

11. A device as claimed in claim 1, wherein said tongue comprises a housing having said oppositely facing major surfaces and having an internal cavity between said major surfaces, each said major surface of the first portion having a plurality of apertures through which protrude respective ones of said locking projections when in their second position, each said locking projection being carried by an actuating member mounted for sliding movement in said cavity, such that sliding movements of said actuating member are also undertaken by said locking projections.

12. A device as claimed in claim 1, wherein the locking projections include an inclined bearing surface facing the direction of insertion.

13. A device as claimed in any preceding claim, wherein the locking projections are made of a plastics material.

14. A device as claimed in any preceding claim, further comprising connecting means to connect the device to another object.

15. A device as in claim 14, wherein the connecting means is coupled permanently to at least one of said first portion and said second portion.

16. A device as claimed in claim 15, wherein the connecting means is a cable with a loop at a free end thereof, the loop being sufficiently large that the first and second portions of the device can be passed through the loop.

* * * * *